United States Patent
Okamura et al.

(10) Patent No.: US 10,480,626 B2
(45) Date of Patent: Nov. 19, 2019

(54) CONTINUOUSLY VARIABLE TRANSMISSION AND BICYCLE

(71) Applicant: Nidec-Shimpo Corporation, Nagaokakyo-shi, Kyoto (JP)

(72) Inventors: Kikuo Okamura, Nagaokakyo (JP); Hitoshi Inoue, Nagaokakyo (JP); Norio Deguchi, Nagaokakyo (JP); Kyohei Haizumi, Nagaokakyo (JP)

(73) Assignee: NIDEC SHIMPO CORPORATION, Kyoto (JP)

( * ) Notice: Subject to any disclaimer, the term of this patent is extended or adjusted under 35 U.S.C. 154(b) by 104 days.

(21) Appl. No.: 15/666,597

(22) Filed: Aug. 2, 2017

(65) Prior Publication Data

US 2018/0106348 A1 Apr. 19, 2018

(30) Foreign Application Priority Data

Oct. 14, 2016 (JP) .................................. 2016-202707

(51) Int. Cl.
*F16H 15/36* (2006.01)
*F16H 15/38* (2006.01)
(Continued)

(52) U.S. Cl.
CPC ........... *F16H 15/503* (2013.01); *B62M 11/12* (2013.01); *F16H 15/22* (2013.01); *F16H 15/30* (2013.01);
(Continued)

(58) Field of Classification Search
CPC .......... F16H 15/22; F16H 15/34; F16H 15/54; F16H 15/503; F16H 13/00; F16H 13/06;
(Continued)

(56) References Cited

U.S. PATENT DOCUMENTS

| 5,007,298 A | * | 4/1991 | Machida | ................. F16H 15/38 475/192 |
| 5,876,299 A | * | 3/1999 | Kim | .................... F16H 37/0853 475/193 |

(Continued)

FOREIGN PATENT DOCUMENTS

| JP | 2006-519349 A | 8/2006 |
| JP | 2016-070393 A | 5/2016 |

(Continued)

OTHER PUBLICATIONS

Okamura et al., "Friction-Type Continuously Variable Transmission", U.S. Appl. No. 15/515,284, filed Mar. 29, 2017.

*Primary Examiner* — Jeffrey A Shapiro
(74) *Attorney, Agent, or Firm* — Keating & Bennett, LLP

(57) ABSTRACT

A continuously variable transmission includes an input rotor, an output rotor, a plurality of planetary rollers, a guide member, a movable ring, and an elastic member. The input rotor is arranged to rotate about a main axis at a rotation rate before a speed change. The output rotor is arranged to rotate about the main axis at a rotation rate resulting from the speed change. The planetary rollers are arranged around the main axis, and each planetary roller is capable of rotating about a rotation shaft. The guide member is arranged to restrict positions of both end portions of the rotation shaft. The movable ring is capable of rotating about the main axis between the main axis and the planetary rollers. The movable ring is annular, and is capable of moving in an axial direction. The elastic member is capable of expanding and contracting in the axial direction. Each planetary roller includes a first slanting surface, a second slanting surface, and an annular recessed portion or annular projecting portion. The guide member is arranged to hold the end portions of the rotation shaft at different circumferential positions such that each end portion of the rotation shaft is capable of (Continued)

shifting a position thereof in a radial direction with respect to the main axis. The elastic member is arranged to apply a pressure to the movable ring in the axial direction.

19 Claims, 12 Drawing Sheets

(51) Int. Cl.

| | | |
|---|---|---|
| *F16H 15/50* | (2006.01) | |
| *F16H 15/30* | (2006.01) | |
| *B62M 11/12* | (2006.01) | |
| *F16H 15/22* | (2006.01) | |
| *F16H 15/34* | (2006.01) | |
| *F16H 15/54* | (2006.01) | |
| *B62M 11/16* | (2006.01) | |
| *B62M 25/02* | (2006.01) | |

(52) U.S. Cl.
CPC ............. *F16H 15/34* (2013.01); *F16H 15/38* (2013.01); *B62M 11/16* (2013.01); *B62M 25/02* (2013.01); *F16H 15/36* (2013.01); *F16H 15/54* (2013.01)

(58) Field of Classification Search
CPC .......... F16H 15/30; F16H 15/36; F16H 15/38; F16H 2015/383; F16H 2015/386; B62M 11/12; B62M 11/16; B62M 25/02
USPC ..... 475/189, 190, 192, 193, 196; 476/39, 40
See application file for complete search history.

(56) References Cited

U.S. PATENT DOCUMENTS

| | | | | |
|---|---|---|---|---|
| 9,005,068 | B2* | 4/2015 | Urabe | F16H 15/503 |
| | | | | 475/193 |
| 9,090,312 | B2* | 7/2015 | Urabe | B62M 11/14 |
| 2006/0084549 | A1 | 4/2006 | Smithson et al. | |
| 2008/0032852 | A1 | 2/2008 | Smithson et al. | |
| 2008/0032853 | A1 | 2/2008 | Smithson et al. | |
| 2008/0032854 | A1 | 2/2008 | Smithson et al. | |
| 2008/0034585 | A1 | 2/2008 | Smithson et al. | |
| 2008/0034586 | A1 | 2/2008 | Smithson et al. | |
| 2008/0039269 | A1 | 2/2008 | Smithson et al. | |
| 2008/0039270 | A1 | 2/2008 | Smithson et al. | |
| 2008/0039271 | A1 | 2/2008 | Smithson et al. | |
| 2008/0039272 | A1 | 2/2008 | Smithson et al. | |
| 2008/0039273 | A1 | 2/2008 | Smithson et al. | |
| 2008/0039274 | A1 | 2/2008 | Smithson et al. | |
| 2008/0039275 | A1 | 2/2008 | Smithson et al. | |
| 2008/0039276 | A1 | 2/2008 | Smithson et al. | |
| 2008/0039277 | A1 | 2/2008 | Smithson et al. | |
| 2008/0040008 | A1 | 2/2008 | Smithson et al. | |
| 2008/0200300 | A1 | 8/2008 | Smithson et al. | |
| 2008/0261747 | A1* | 10/2008 | Triller | B60K 6/36 |
| | | | | 475/216 |
| 2009/0221391 | A1* | 9/2009 | Bazyn | F16H 15/52 |
| | | | | 475/159 |
| 2010/0137094 | A1* | 6/2010 | Pohl | F16H 15/52 |
| | | | | 475/149 |
| 2011/0218072 | A1* | 9/2011 | Lohr | F16H 15/28 |
| | | | | 475/185 |
| 2011/0319222 | A1 | 12/2011 | Ogawa et al. | |
| 2013/0095977 | A1 | 4/2013 | Smithson et al. | |
| 2013/0184115 | A1* | 7/2013 | Urabe | B62M 11/14 |
| | | | | 475/193 |
| 2015/0337928 | A1 | 11/2015 | Smithson et al. | |
| 2016/0230858 | A1* | 8/2016 | Kliewer | F16H 15/503 |
| 2017/0219069 | A1 | 8/2017 | Okamura et al. | |

FOREIGN PATENT DOCUMENTS

| | | |
|---|---|---|
| WO | 2004079223 A2 | 9/2004 |
| WO | 2010092661 A1 | 8/2010 |

* cited by examiner

US 10,480,626 B2

CONTINUOUSLY VARIABLE TRANSMISSION AND BICYCLE

CROSS REFERENCE TO RELATED APPLICATIONS

This application claims the benefit of priority to Japanese Patent Application No. 2016-202707 filed on Oct. 14, 2016. The entire contents of this application are hereby incorporated herein by reference.

BACKGROUND OF THE INVENTION

1. Field of the Invention

The present invention relates to a continuously variable transmission and a bicycle.

2. Description of the Related Art

A bicycle including a transmission system is known. A common transmission system for a bicycle is configured such that a roller chain can be shifted from one sprocket to another among a plurality of sprockets having different diameters. If a user of the bicycle operates a shift lever on a handlebar, the roller chain is shifted to a sprocket specified using the shift lever. As a result, a rear wheel rotates with a speed change ratio in accordance with the diameter of the sprocket. This common transmission system, however, allows a change in the speed change ratio only within a limited number of options corresponding to the number of sprockets.

In contrast, JP-A 2011-231929 describes a transmission (CVT) for use in a bicycle which allows the speed change ratio to be continuously varied. The transmission described in JP-A 2011-231929 shifts the ratio of input torque to output torque by causing a rotation shaft of a ball included in a ball-leg assembly to be inclined.

However, even in the case of the transmission described in JP-A 2011-231929, a change in the speed change ratio is performed by a user operation. A capability to automatically change the speed change ratio in accordance with a load without the need for a shifting operation by the user would be very convenient, just as an automatic transmission of an automobile is.

SUMMARY OF THE INVENTION

A continuously variable transmission according to a preferred embodiment of the present invention includes an input rotor, an output rotor, a plurality of planetary rollers, a guide member, a movable ring, and an elastic member. The input rotor is arranged to rotate about a main axis at a rotation rate before a speed change. The output rotor is arranged to rotate about the main axis at a rotation rate resulting from the speed change. The planetary rollers are arranged around the main axis, and each planetary roller includes a rotation shaft and is capable of rotating about the rotation shaft. The guide member is arranged to restrict positions of both end portions of the rotation shaft. The movable ring is capable of rotating about the main axis between the main axis and the planetary rollers. The movable ring is annular, and is capable of moving in an axial direction. The elastic member is capable of expanding and contracting in the axial direction. Each planetary roller includes a first slanting surface, a second slanting surface, and an annular recessed portion or annular projecting portion. The first slanting surface is conical and is arranged to make contact with the input rotor. The second slanting surface is conical and is arranged to make contact with the output rotor. The annular recessed portion or the annular projecting portion is arranged to be engaged with the movable ring. The guide member is arranged to hold the end portions of the rotation shaft at different circumferential positions such that each end portion of the rotation shaft is capable of shifting a position thereof in a radial direction with respect to the main axis. The elastic member is arranged to apply a pressure to the movable ring in the axial direction.

According to the above preferred embodiment of the present invention, the angle of inclination of the rotation shaft of each planetary roller in a section of the continuously variable transmission including the main axis changes in accordance with a load applied to the planetary roller. Accordingly, a position at which the input rotor is in contact with the first slanting surface, and a position at which the output rotor is in contact with the second slanting surface both change. A change in the speed change ratio between the input rotor and the output rotor can thus be achieved. That is, an automatic change in the speed change ratio in accordance with the load can be achieved.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings. It is assumed herein that a direction parallel to a main axis of a continuously variable transmission is referred to by the term "axial direction", "axial", or "axially", that directions perpendicular to the main axis are each referred to by the term "radial direction", "radial", or "radially", and that a direction along a circular arc centered on the main axis is referred to by the term "circumferential direction", "circumferential", or "circumferentially". Note, however, that the term "parallel" as used above includes "substantially parallel". Also note that the term "perpendicular" as used above includes "substantially perpendicular". It is assumed herein that an axial end of any member on a side closer to a sprocket will be referred to as a "first end", while an axial end of the member on a side away from the sprocket will be referred to as a "second end".

Figure 1:
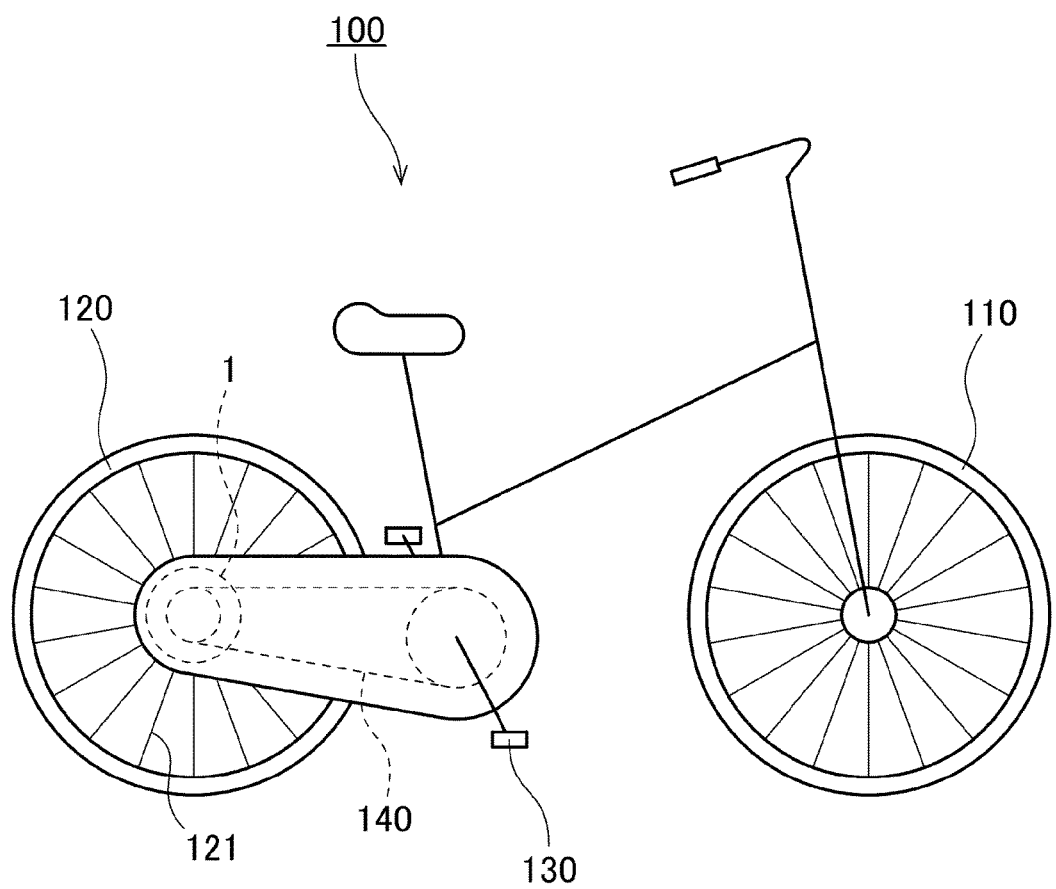
FIG. 1 is a schematic diagram of a bicycle according to a preferred embodiment of the present invention.

FIG. 1 is a schematic diagram of a bicycle 100 in which a continuously variable transmission 1 according to one preferred embodiment of the present invention is used. Referring to FIG. 1, the bicycle 100 includes a front wheel 110, a rear wheel 120, pedals 130, a roller chain 140, and the continuously variable transmission 1. The continuously variable transmission 1 is installed inside of a hub arranged in a center of a wheel 121 of the rear wheel 120. Once a user works the pedals 130 in a forward direction, rotational motion of the pedals 130 is transmitted to the continuously variable transmission 1 through the roller chain 140. The continuously variable transmission 1 changes the speed of the rotational motion received from the roller chain 140, and transmits the resulting rotational motion to the rear wheel 120. The rear wheel 120 rotates at a rotation rate resulting from the speed change caused by the continuously variable transmission 1. Note that the bicycle 100 may include an electric motor to provide assistance in the rotational motion of the pedals 130.

Figure 2:
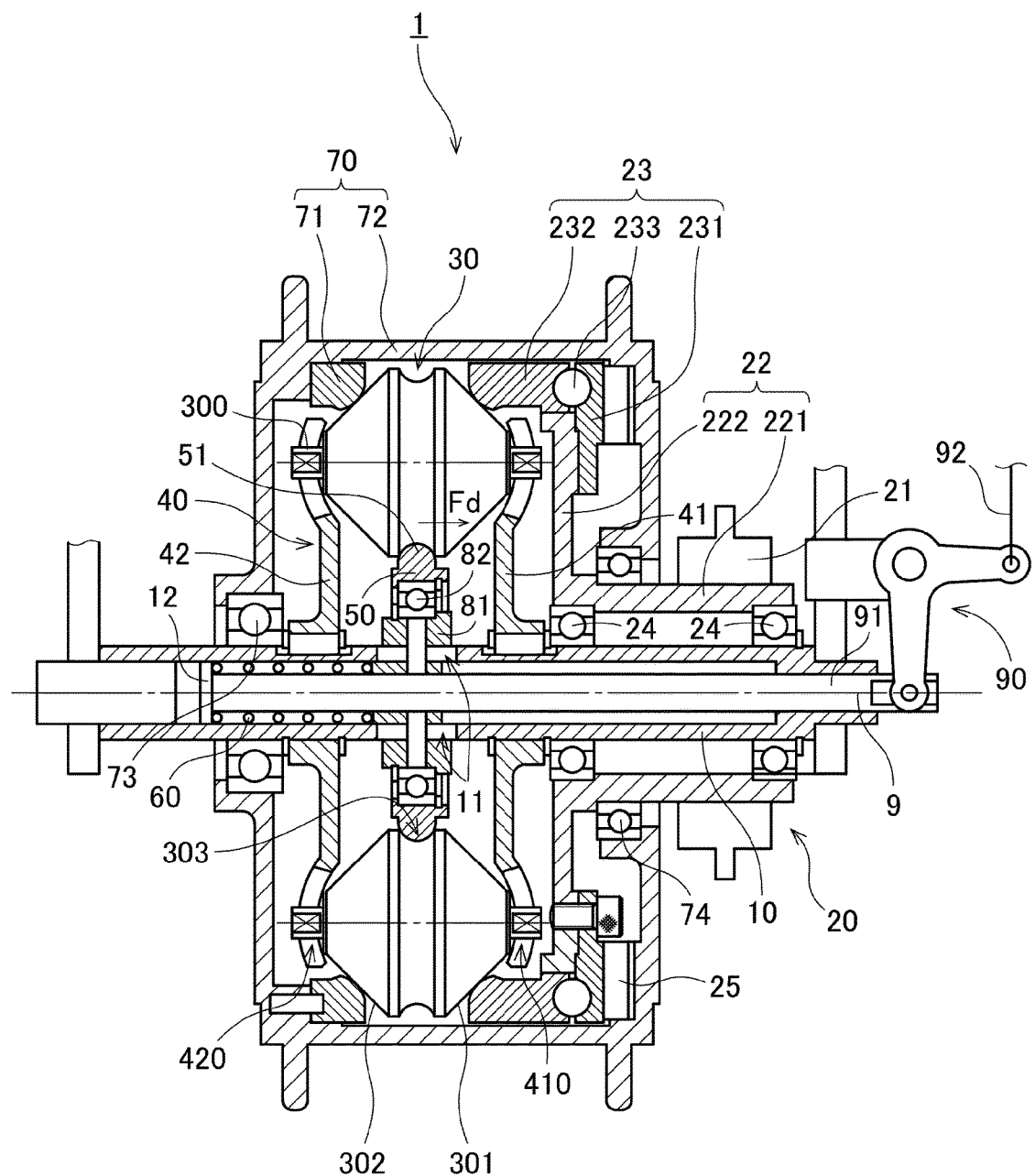
FIG. 2 is a vertical sectional view of a continuously variable transmission according to the above preferred embodiment of the present invention.
Figure 3:
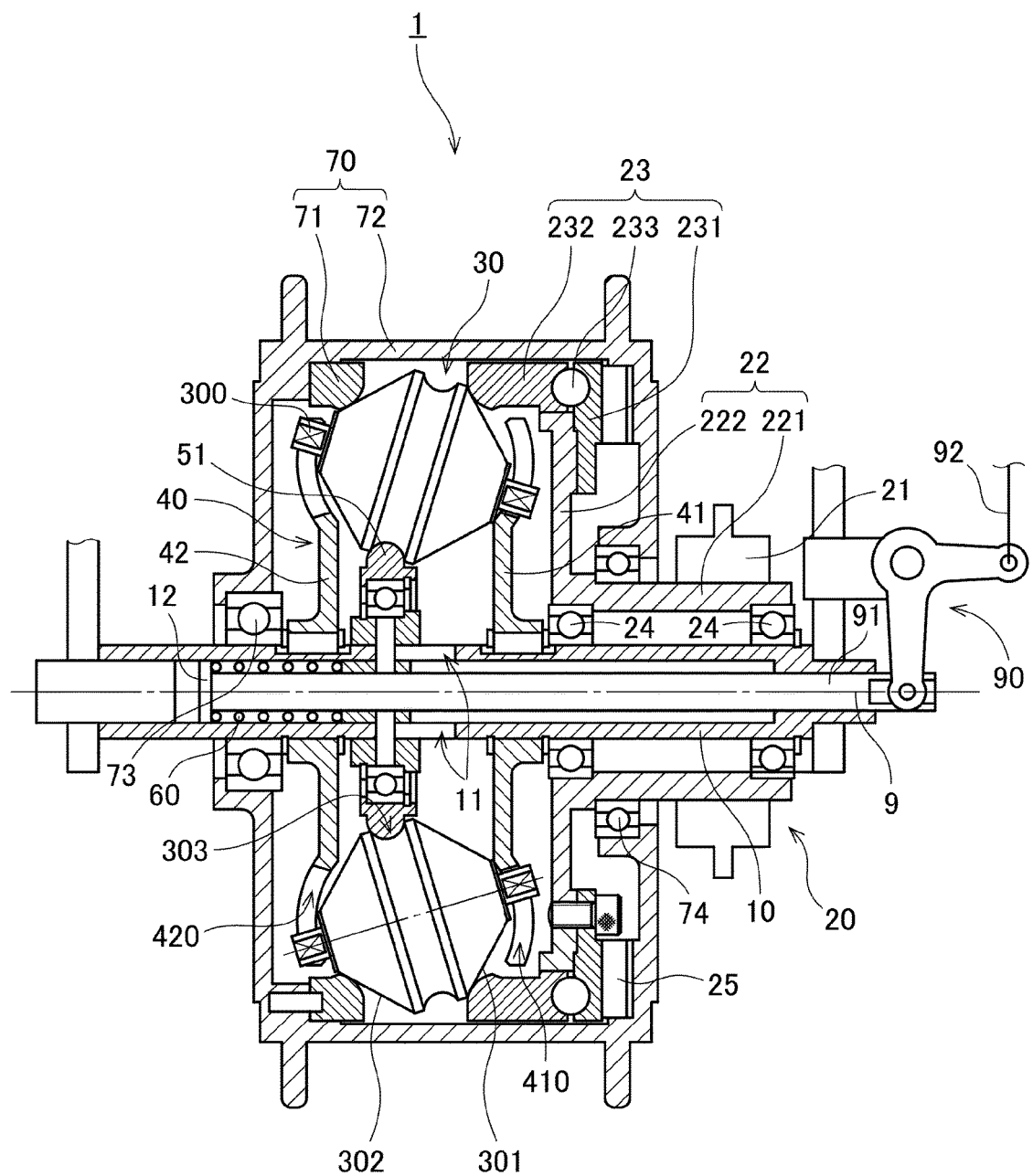
FIG. 3 is a vertical sectional view of the continuously variable transmission.
Figure 4:
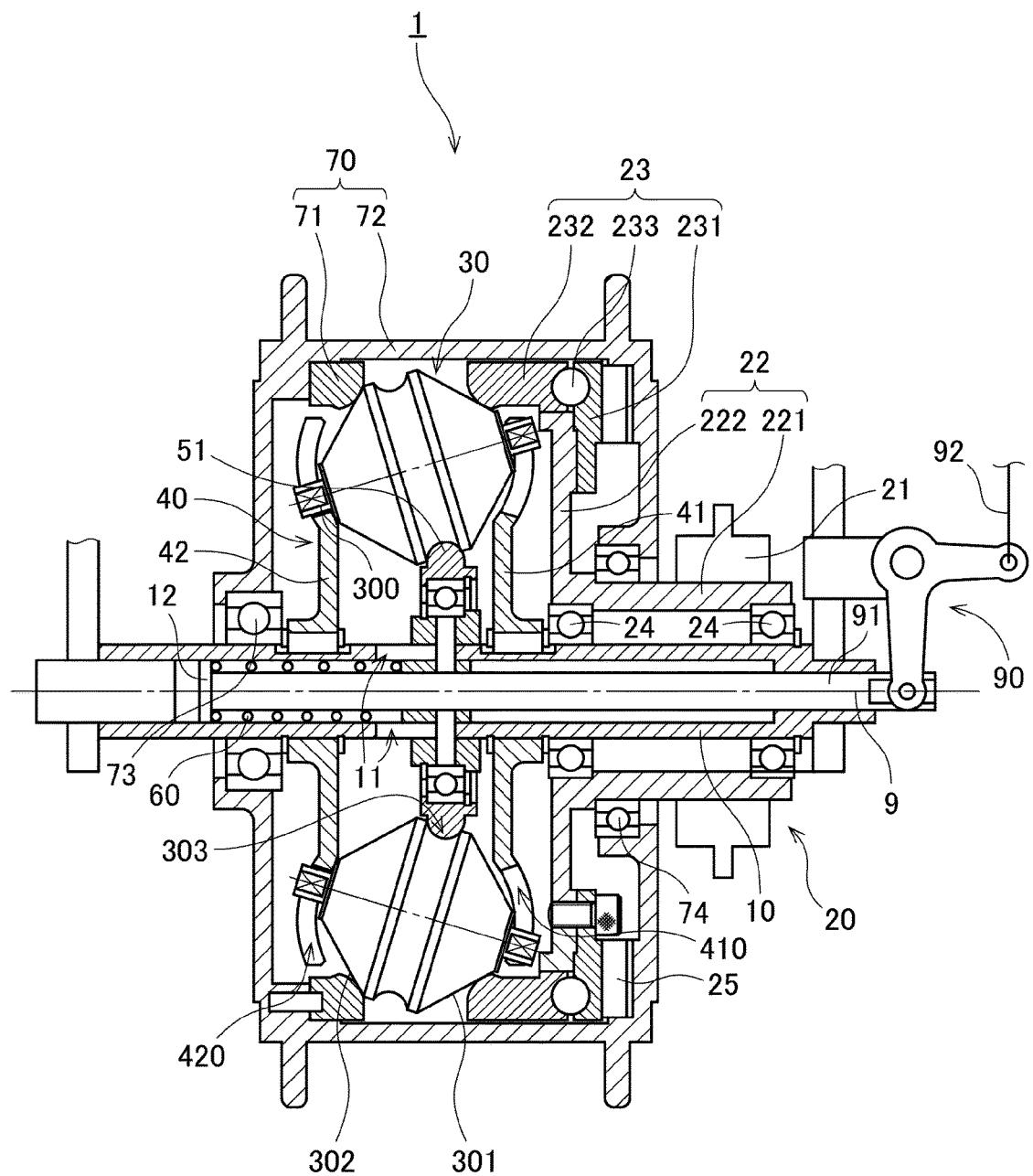
FIG. 4 is a vertical sectional view of the continuously variable transmission.

Each of FIGS. 2, 3, and 4 is a vertical sectional view of the continuously variable transmission 1. The continuously variable transmission 1 is a mechanism to output the rotational motion received from the roller chain 140 to the rear wheel 120, without changing the speed of the rotational motion or while reducing or increasing the speed of the rotational motion. FIG. 2 illustrates a section of the continuously variable transmission 1 when the speed of the rotational motion is not changed. FIG. 3 illustrates a section of the continuously variable transmission 1 when the speed of the rotational motion is reduced. FIG. 4 is a section of the continuously variable transmission 1 when the speed of the rotational motion is increased. Referring to FIGS. 2 to 4, the continuously variable transmission 1 according to the present preferred embodiment includes a hollow shaft 10, an input rotor 20, a plurality of planetary rollers 30, a guide member 40, a movable ring 50, a coil spring 60, and an output rotor 70.

The hollow shaft 10 is a cylindrical member arranged to extend along a main axis 9. A metal, such as, for example, stainless steel, is used as a material of the hollow shaft 10. Each of the input rotor 20, the movable ring 50, and the output rotor 70, which will be described below, is supported by the hollow shaft 10 through a bearing. When the continuously variable transmission 1 is attached to the bicycle 100, the continuously variable transmission 1 is arranged such that the main axis 9, which is a central axis of the hollow shaft 10, and a central axis of the rear wheel 120 coincide with each other.

The input rotor 20 is arranged to rotate about the main axis 9 in accordance with rotation of the roller chain 140. Referring to FIGS. 2 to 4, the input rotor 20 according to the present preferred embodiment includes a sprocket 21, an intermediate member 22, and a pressure control cam 23.

The intermediate member 22 includes a cylindrical portion 221 and a flange portion 222. The cylindrical portion 221 is arranged to extend in an axial direction around the hollow shaft to assume a cylindrical shape. The flange portion 222 is arranged to extend radially outward from an axial end portion of the cylindrical portion 221. The flange portion 222 is arranged inside of a housing 72, which will be described below. A pair of first bearings 24 are arranged between the intermediate member 22 and the hollow shaft 10. A ball bearing, for example, is used as each first bearing 24. The intermediate member 22 is supported through the first bearings 24 to be rotatable with respect to the hollow shaft 10.

The sprocket 21 is fixed to an outer circumferential surface of the cylindrical portion 221. The roller chain 140 of the bicycle 100 is engaged with a plurality of teeth defined in an outer circumferential surface of the sprocket 21. Each of the sprocket 21 and the intermediate member 22 is arranged to rotate about the main axis 9 at a rotation rate before the speed change in accordance with the rotation of the roller chain 140 while the bicycle 100 is traveling. The rotation rate of each of the sprocket 21 and the intermediate member 22 will be hereinafter referred to as a "first rotation rate".

The pressure control cam 23 is a mechanism to generate an axial pressing force acting on the planetary rollers 30 in accordance with a load acting in the rotation direction. The pressure control cam 23 includes a first cam member 231 and a second cam member 232 arranged in the axial direction, and a plurality of rolling elements 233. Each of the first and second cam members 231 and 232 is an annular member centered on the main axis 9. The first cam member 231 and the flange portion 222 of the intermediate member 22 are fixed to each other through, for example, screwing. Each of the rolling elements 233 is a spherical member arranged between the first and second cam members 231 and 232.

Figure 5:
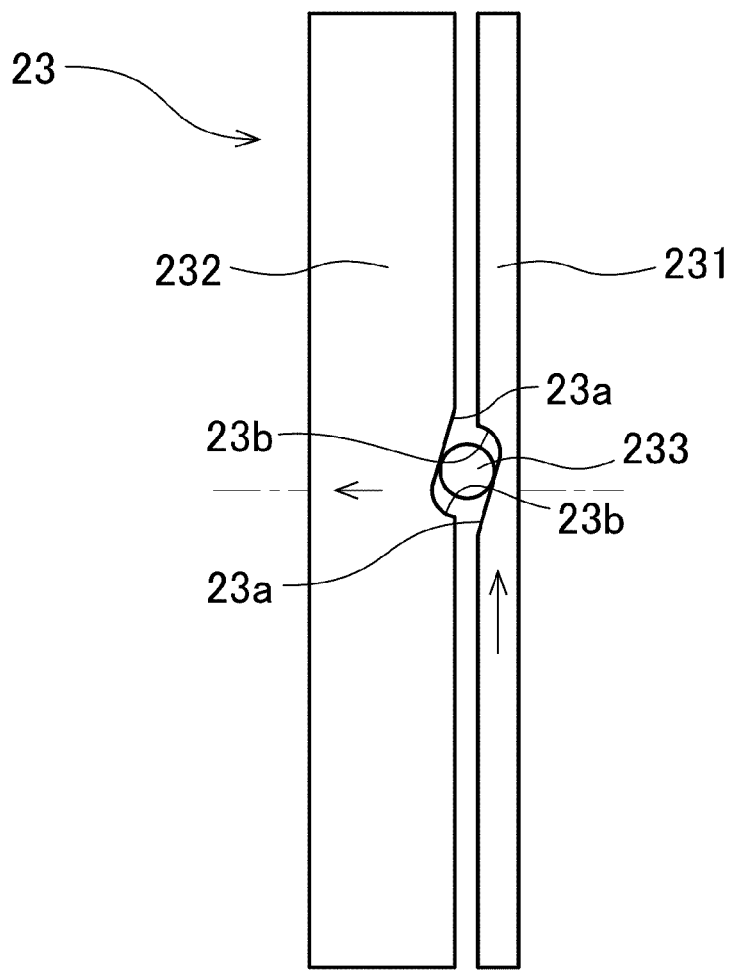
FIG. 5 is a side view of a pressure control cam according to the above preferred embodiment of the present invention.
Figure 6:
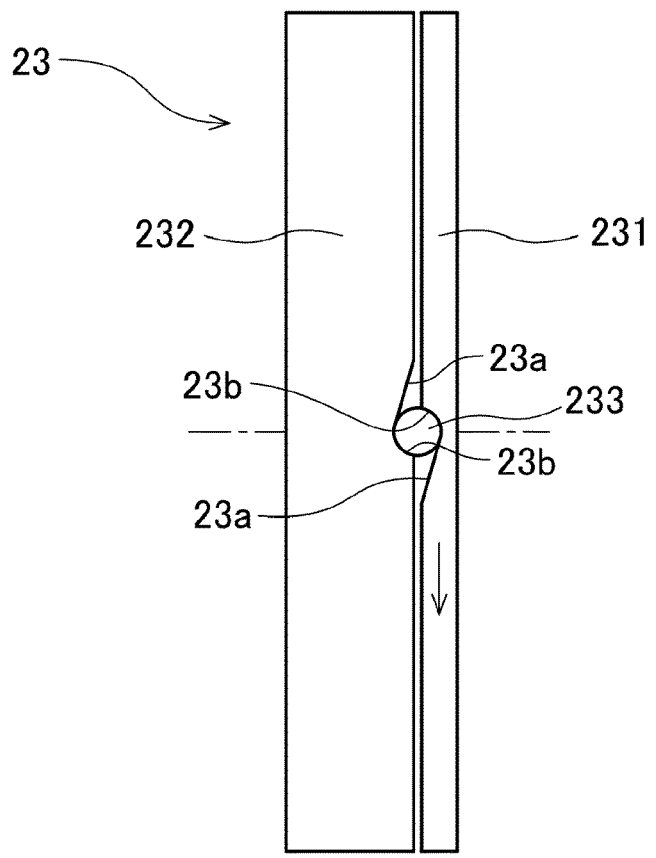
FIG. 6 is a side view of the pressure control cam.

Each of FIGS. 5 and 6 is a side view of the pressure control cam 23. Referring to FIGS. 5 and 6, each of the first and second cam members 231 and 232 includes a plurality of first cam surfaces 23a and a plurality of second cam surfaces 23b. Each rolling element 233 is accommodated in a space between the first and second cam surfaces 23a and 23b of the first cam member 231 and the first and second cam surfaces 23a and 23b of the second cam member 232.

An angle of the first cam surface 23a with respect to a circumferential direction is smaller than an angle of the second cam surface 23b with respect to the circumferential direction. The angle of the first cam surface 23a with respect to the circumferential direction is arranged to be, for example, in the range of 3° to 35° inclusive. The angle of the second cam surface 23b with respect to the circumferential direction is arranged to be, for example, in the range of 70° inclusive to 90° exclusive.

Once the user of the bicycle 100 works the pedals 130, the input rotor 20 rotates in the forward direction. At this time, as illustrated in FIG. 5, each rolling element 233 shifts the position thereof in such a direction as to climb up along the first cam surfaces 23a of the first and second cam members 231 and 232 while making contact with the first cam surfaces 23a. As a result, the rolling element 233 causes the second cam member 232 to move away from the first cam member 231. Accordingly, contact pressure between the second cam member 232 and a first slanting surface 301 of each planetary roller 30, which will be described below, is increased.

Meanwhile, if the user of the bicycle 100 causes the pedals 130 to rotate in a reverse direction or at a speed lower than that of the rear wheel 120, the input rotor 20 rotates in the reverse direction. At this time, as illustrated in FIG. 6, each rolling element 233 makes contact with the second cam surfaces 23b of the first and second cam members 231 and 232. As a result, the first and second cam members 231 and 232 rotate as if in one piece, without the rolling element 233 changing the circumferential and axial positions of the second cam surfaces 23b of the first and second cam members 231 and 232 relative to each other. Accordingly, the contact pressure between the second cam member 232 and the first slanting surface 301 of each planetary roller 30, which will be described below, is decreased. As a result, the input rotor 20 and the output rotor 70 rotate at idle. In other words, the pressure control cam 23 enables the continuously variable transmission 1 to function as a one-way clutch.

A thrust bearing 25 is arranged between the first cam member 231 of the pressure control cam 23 and the housing 72, which will be described below. A needle bearing, for example, is used as the thrust bearing 25. The first cam member 231 and the housing 72 are thus arranged to rotate relative to each other through the thrust bearing 25. This enables the input rotor 20 and the output rotor 70 to rotate at different rotation rates.

The planetary rollers 30 are arranged around the main axis 9. Each planetary roller 30 is supported to be rotatable about a rotation shaft 300 capable of oscillating. Referring to FIGS. 2 to 4, a surface of each planetary roller 30 includes the first slanting surface 301, a second slanting surface 302, and an annular recessed portion 303. The first slanting surface 301 is a conical surface which gradually increases in a diameter with increasing distance from a first end of the rotation shaft 300. The first slanting surface 301 is arranged to make contact with the second cam member 232. The second slanting surface 302 is a conical surface which gradually increases in a diameter with increasing distance from a second end of the rotation shaft 300. The second slanting surface 302 is arranged to make contact with a contact member 71 of the output rotor 70, which will be described below.

The annular recessed portion 303 is an annular groove centered on the rotation shaft 300. The annular recessed portion 303 is arranged between the first and second slanting surfaces 301 and 302. Referring to FIGS. 2 to 4, the annular recessed portion 303 forms a substantially circular arc in a section of the continuously variable transmission 1 including the main axis 9. An annular projecting portion 51 of the movable ring 50, which will be described below, is arranged to make contact with the annular recessed portion 303.

As described above, each planetary roller 30 is arranged to make contact with the input rotor 20, the output rotor 70, and the movable ring 50, and is supported at three positions where the planetary roller 30 makes contact with the input rotor 20, the output rotor 70, and the movable ring 50, respectively.

Figure 7:
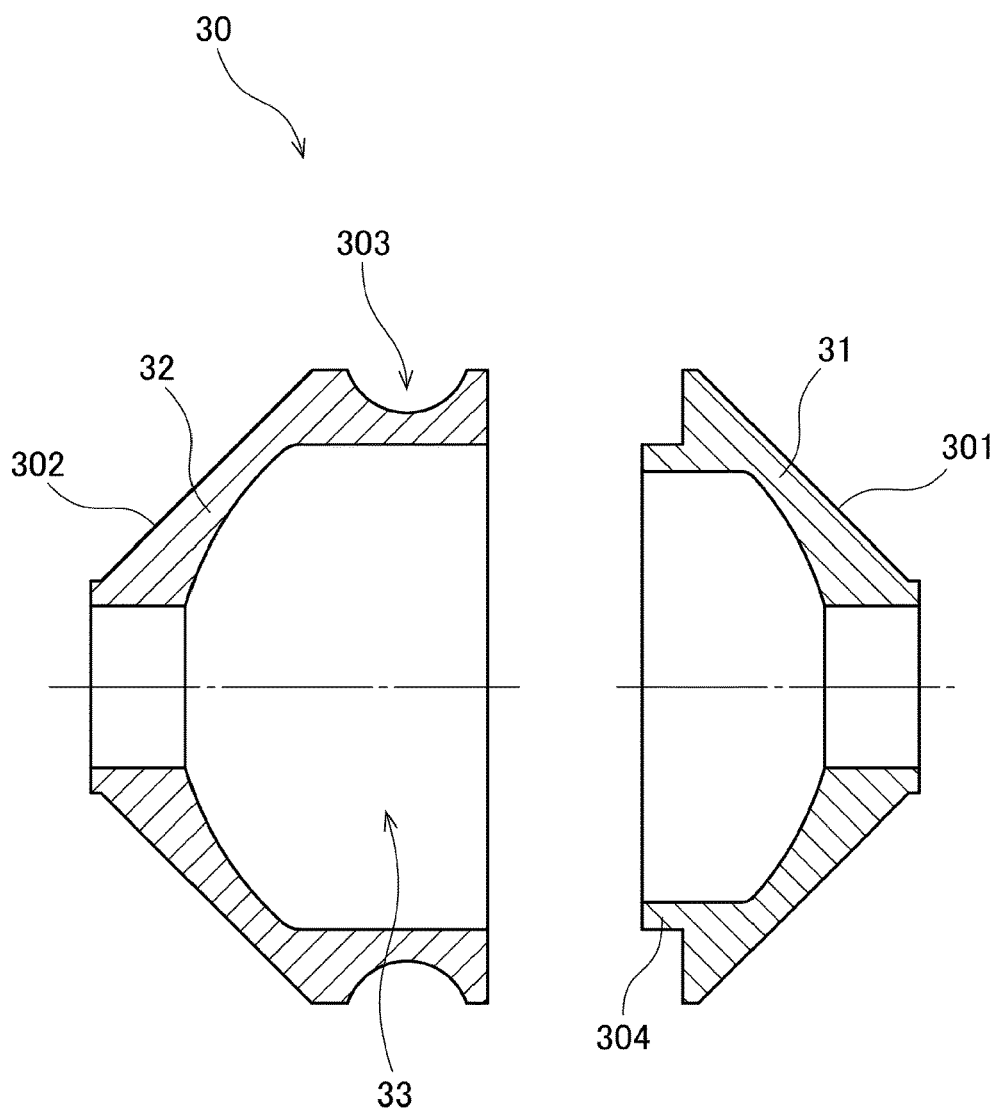
FIG. 7 is an exploded sectional view of a planetary roller according to the above preferred embodiment of the present invention.

FIG. 7 is an exploded sectional view of the planetary roller 30. Referring to FIG. 7, the planetary roller 30 according to the present preferred embodiment is defined by a first planetary member 31 and a second planetary member 32 fitted to each other in the axial direction. The first planetary member 31 is a conical member including the first slanting surface 301. The second planetary member 32 is a conical member including the second slanting surface 302 and the annular recessed portion 303. When the first and second planetary members 31 and 32 are fitted to each other, a cylindrical projection 304 defined in the first planetary member 31 is press fitted to the second planetary member 32, for example. Note, however, that the first and second planetary members 31 and 32 may alternatively be fixed to each other by another method, such as, for example, welding.

The planetary roller 30 preferably includes an internal cavity 33 to achieve a reduction in weight. The planetary roller 30 including the internal cavity 33 can be easily defined in the case where the planetary roller 30 is defined by the first and second planetary members 31 and 32 fitted to each other as in the present preferred embodiment.

In addition, as illustrated in FIG. 7, in the present preferred embodiment, the first planetary member 31, which is conical, is arranged to increase in a thickness with decreasing distance from a vertex thereof. More specifically, the first planetary member 31 is arranged to increase in an axial or radial thickness with decreasing distance from the vertex of the first planetary member 31. The second planetary member 32, which is conical, is also arranged to increase in a thickness with decreasing distance from a vertex thereof. More specifically, the second planetary member 32 is arranged to increase in an axial or radial thickness with decreasing distance from the vertex of the second planetary member 32.

When the continuously variable transmission 1 is used, a particularly large load is applied to a portion of each of the first and second planetary members 31 and 32 near the vertex thereof. Increasing the thickness of the portion thereof near the vertex thereof contributes to preventing each of the first and second planetary members 31 and 32 from being deformed by a load during use.

In the present preferred embodiment, the entire annular recessed portion 303 belongs to the second planetary member 32. In other words, the annular recessed portion 303 is not divided between two separate members. This arrangement prevents a minute step from being defined in a surface of the annular recessed portion 303. That is, an increase in dimensional accuracy of the annular recessed portion 303 can be achieved. Moreover, an increase in rigidity of the annular recessed portion 303 can also be achieved. The above arrangement thus enables the annular projecting portion 51 of the movable ring 50, which will be described below, to make contact with the annular recessed portion 303 with high accuracy. Note that the annular recessed portion 303 may alternatively belong to the first planetary member 31.

The guide member 40 includes a first guide plate 41 and a second guide plate 42. Each of the first and second guide plates 41 and 42 is a disk-shaped member fixed to the hollow shaft 10. Each of the first and second guide plates 41 and 42 is arranged to be incapable of rotating relative to the hollow shaft 10. Referring to FIGS. 2 to 4, the first and second guide plates 41 and 42 are arranged on opposite axial sides of the planetary rollers 30. Each of the first and second guide plates 41 and 42 is arranged to extend perpendicularly to the main axis 9.

Figure 8:
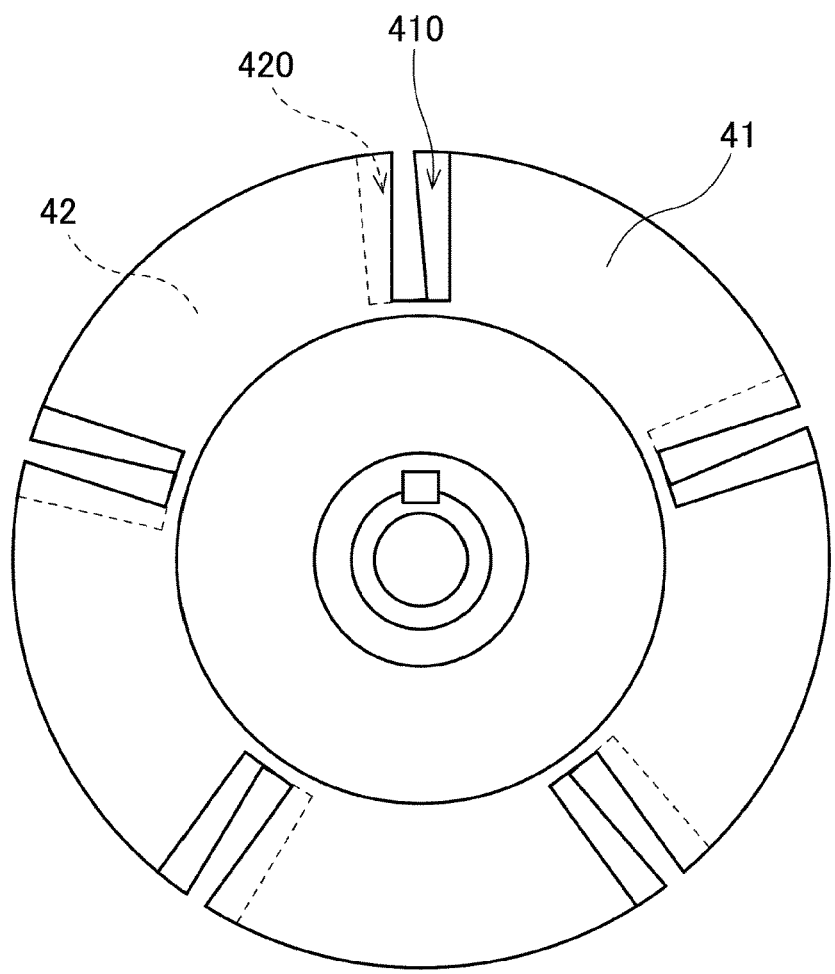
FIG. 8 is a plan view of a first guide plate and a second guide plate according to the above preferred embodiment of the present invention when viewed from one side along a main axis.
Figure 9:
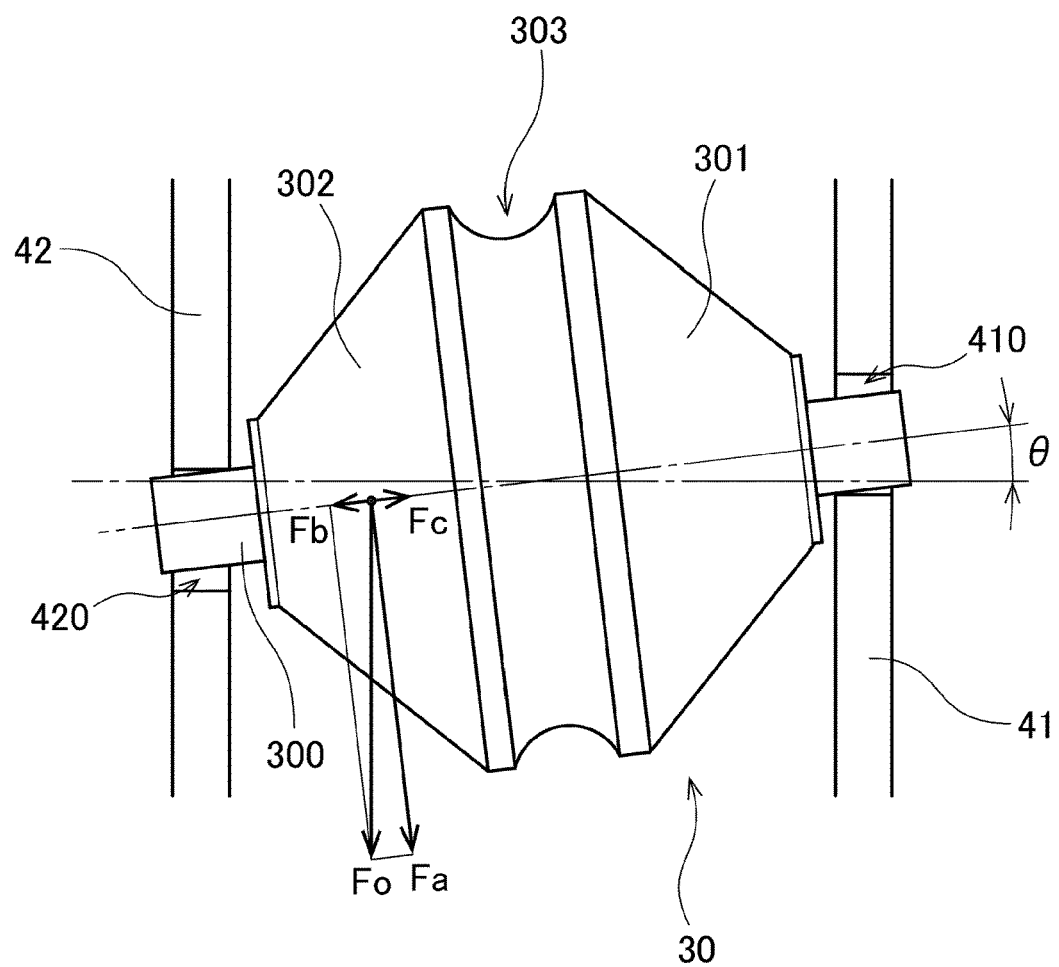
FIG. 9 is a diagram illustrating the planetary roller when viewed from radially outside.

FIG. 8 is a plan view of the first and second guide plates 41 and 42 when viewed from one side along the main axis 9. FIG. 9 is a diagram illustrating the planetary roller 30 when viewed from radially outside. Referring to FIGS. 8 and 9, the first guide plate 41 includes a plurality of first cuts 410 arranged at regular intervals in the circumferential direction. Each first cut 410 is recessed radially inward from an outer circumferential portion of the first guide plate 41. The second guide plate 42 includes a plurality of second cuts 420 arranged at regular intervals in the circumferential direction. Each second cut 420 is recessed radially inward from an outer circumferential portion of the second guide plate 42.

The first end of the rotation shaft 300 of each planetary roller 30 is fitted in a corresponding one of the first cuts 410. The second end of the rotation shaft 300 of each planetary roller 30 is fitted in a corresponding one of the second cuts 420. The positions of both end portions of the rotation shaft 300 of the planetary roller 30 are thus restricted.

Referring to FIGS. 8 and 9, the circumferential positions of the first cuts 410 with respect to the main axis 9 and the circumferential positions of the second cuts 420 with respect to the main axis 9 are slightly different from each other. As a result, as illustrated in FIG. 9, the end portions of the rotation shaft 300 are held at different circumferential positions by the first and second guide plates 41 and 42. The state in which the circumferential positions of the end portions of the rotation shaft 300 are different from each other will be hereinafter referred to as a "circumferentially inclined state". Each planetary roller 30 is supported in the circumferentially inclined state at all times.

In addition, one of the end portions of the rotation shaft 300 is capable of shifting the position thereof in a radial direction along the first cut 410. The other end portion of the rotation shaft 300 is capable of shifting the position thereof in a radial direction along the second cut 420. As described below, the end portions of the rotation shaft 300 shift the positions thereof in the radial direction in accordance with a load during driving. An angle of inclination of the rotation shaft 300 in a section of the continuously variable transmission 1 including the main axis 9 accordingly changes. Hereinafter, the rotation shaft 300 of the planetary roller 30 will be described as being "radially inclined" when the rotation shaft 300 of the planetary roller 30 is inclined with respect to the main axis 9 as a result of the shifting of the positions of the end portions of the rotation shaft 300 in the radial direction.

The movable ring 50 is an annular member arranged between the hollow shaft 10 and the planetary rollers 30. The movable ring 50 includes the annular projecting portion 51, which is arranged to project radially outward. Referring to FIGS. 2 to 4, the annular projecting portion 51 forms a substantially circular arc in a section of the continuously variable transmission 1 including the main axis 9. The annular projecting portion 51 is fitted in the annular recessed portion 303 of each planetary roller 30. The movable ring 50 is thus engaged with each planetary roller 30.

The movable ring 50 is supported by the hollow shaft 10 through an engagement member 81 and a second bearing 82. A ball bearing, for example, is used as the second bearing 82. The movable ring 50 is fixed to an outer race of the second bearing 82. The movable ring 50 is accordingly capable of rotating about the main axis 9 relative to the hollow shaft 10 and the engagement member 81.

In addition, referring to FIGS. 2 to 4, the hollow shaft includes a slit 11 extending in the axial direction. The engagement member 81 is fixed to an inner race of the second bearing 82, and is engaged with the slit 11. Accordingly, the engagement member 81, the second bearing 82, and the movable ring 50 are able to move, as a unit, in the axial direction along the slit 11. If the rotation shaft 300 of each planetary roller 30 is radially inclined with respect to the main axis 9, the position of the annular projecting portion 51 engaged with the annular recessed portion 303 changes in the axial direction. The engagement member 81, the second bearing 82, and the movable ring 50 accordingly move in the axial direction along the slit 11.

The coil spring 60 is an elastic member capable of expanding and contracting in the axial direction. The coil spring 60 is accommodated inside of the hollow shaft 10. A free end of the coil spring 60, which is a first end thereof with respect to the axial direction, is arranged to make contact with the engagement member 81. As a result, the axial position of the free end relative to the movable ring 50 is fixed. In addition, a positioning member 12 is arranged inside of the hollow shaft 10. A fixed end of the coil spring 60, which is a second end thereof with respect to the axial direction, is arranged to make contact with the positioning member 12. As a result, the axial position of the fixed end relative to the hollow shaft 10 is fixed. Thus, the coil spring 60 is arranged in a compressed state, having a length shorter than a natural length thereof, between the positioning member 12 and the engagement member 81. Accordingly, the coil spring 60 constantly applies a pressure to the engagement member 81, the second bearing 82, and the movable ring 50 in such a direction as to move the engagement member 81, the second bearing 82, and the movable ring 50 away from the positioning member 12 toward the first-end side in the axial direction.

The output rotor 70 is arranged to rotate about the main axis 9 at a rotation rate resulting from the speed change. Referring to FIGS. 2 to 4, the output rotor 70 according to the present preferred embodiment includes the contact member 71 and the housing 72. The contact member 71 is an annular member centered on the main axis 9. The contact member 71 is arranged to make contact with the second slanting surface 302 of each planetary roller 30. The housing 72 is an annular case in which the pressure control cam 23, the planetary rollers 30, the guide member 40, and the movable ring 50 are accommodated. The housing 72 is supported by the hollow shaft 10 through a third bearing 73. In addition, the housing 72 is supported by the intermediate member 22 through a fourth bearing 74.

The contact member 71 and the housing 72 are fixed to each other such that the contact member 71 and the housing 72 are incapable of rotating relative to each other. Accordingly, once the contact member 71 rotates in accordance with the rotation of the planetary rollers 30, the housing 72 also rotates about the main axis 9 together with the contact member 71. The rotation rate of each of the contact member 71 and the housing 72 will be hereinafter referred to as a "second rotation rate". In addition, the housing 72 is fixed to the hub arranged in the center of the wheel 121 of the rear wheel 120 of the bicycle 100. Accordingly, the rear wheel 120 of the bicycle 100 also rotates at the second rotation rate in accordance with the rotation of the housing 72.

Next, a speed changing operation of the continuously variable transmission 1 described above will now be described below.

If the input rotor 20 rotates at the first rotation rate by receiving power from the roller chain 140, the second cam member 232 of the pressure control cam 23 also rotates at the first rotation rate while making contact with the first slanting surface 301 of each planetary roller 30. Then, friction between the second cam member 232 and the first slanting surface 301 causes the planetary roller 30 to rotate about the rotation shaft 300. In addition, friction between the second slanting surface 302 and the contact member 71 causes the output rotor 70 to rotate at the second rotation rate. At this time, as indicated by a thick line in FIG. 9, the second slanting surface 302 of the planetary roller 30 applies a force Fo proportional to torque and acting along a tangent to the contact member 71 to the contact member 71.

Here, the planetary roller 30 is supported in the circumferentially inclined state as described above. Therefore, the force Fo produces a component force Fa acting in a circumferential direction about the rotation shaft 300, and a component force Fb acting in a direction parallel to the rotation shaft 300. When the planetary roller 30 is circumferentially inclined at an angle θ, the component forces Fa and Fb satisfy the following relationship: Fb=Fa·tan θ. If the component force Fb, which acts in the direction parallel to the rotation shaft 300, is applied to the contact member 71, the planetary roller 30 receives a reaction force Fc, which has the same magnitude as that of the component force Fb, from the contact member 71. This reaction force Fc acts to cause the rotation shaft 300 to be radially inclined in such a direction that the first end (i.e., an end portion on the side closer to the input rotor 20) of the rotation shaft 300 of the planetary roller 30 moves closer to the main axis 9.

Meanwhile, the coil spring 60 applies a pressure to the engagement member 81, the second bearing 82, and the movable ring 50 in such a direction as to move the engagement member 81, the second bearing 82, and the movable ring 50 away from the positioning member 12 in the axial direction. Accordingly, as indicated in FIG. 2, the planetary roller 30 receives an axial force Fd from the movable ring 50. This force Fd acts to cause the rotation shaft 300 to be radially inclined in such a direction that the first end of the rotation shaft 300 of the planetary roller 30 moves away from the main axis 9. The more the rotation shaft 300 of the planetary roller 30 is inclined in such a direction that the first end of the rotation shaft 300 moves closer to the main axis 9, the more the coil spring 60 is compressed, and the greater the force Fd becomes.

As described above, in a situation in which a load is being applied to the input rotor 20, the two forces Fc and Fd, which act to cause the rotation shaft 300 to be radially inclined in mutually opposite directions, are applied to the planetary roller 30. The rotation shaft 300 stops at an angle of inclination which causes these forces Fc and Fd to be in balance. Then, the planetary roller 30 rotates about the rotation shaft 300 with the rotation shaft 300 being inclined at this angle of inclination.

Suppose, for example, that the load is large (i.e., the force Fo is strong). In this case, the component force Fb of the force Fo is also large. Accordingly, the reaction force Fc of the component force Fb is also large. As a result, as illustrated in FIG. 3, the planetary roller 30 is radially inclined in such a direction that the first end of the rotation shaft 300 moves closer to the main axis 9. As a result, the distance of a portion of the first slanting surface 301 which is in contact with the input rotor from the rotation shaft 300 increases. In addition, the distance of a portion of the second slanting surface 302 which is in contact with the output rotor 70 from the rotation shaft 300 decreases. This causes the second rotation rate, which is the rotation rate of the output rotor 70, to be lower than the first rotation rate, which is the rotation rate of the input rotor 20. That is, the rotational motion of the input rotor 20 is reduced in speed, and is then outputted to the rear wheel 120 through the output rotor 70.

Meanwhile, suppose that the load is small (i.e., the force Fo is weak). In this case, the component force Fb of the force Fo is also small. Accordingly, the reaction force Fc of the component force Fb is also small. As a result, as illustrated in FIG. 4, the planetary roller 30 is radially inclined in such a direction that the first end of the rotation shaft 300 moves away from the main axis 9. As a result, the distance of the portion of the first slanting surface 301 which is in contact with the input rotor 20 from the rotation shaft 300 decreases. In addition, the distance of the portion of the second slanting surface 302 which is in contact with the output rotor 70 from the rotation shaft 300 increases. This causes the second rotation rate, which is the rotation rate of the output rotor 70, to be higher than the first rotation rate, which is the rotation rate of the input rotor 20. That is, the rotational motion of the input rotor 20 is increased in speed, and is then outputted to the rear wheel 120 through the output rotor 70.

As described above, in the continuously variable transmission 1 according to the present preferred embodiment, the angle of inclination of the rotation shaft 300 of each planetary roller 30 in a section of the continuously variable transmission 1 including the main axis 9 changes in accordance with the load applied to the planetary roller 30. Accordingly, a position at which the input rotor 20 is in contact with the first slanting surface 301, and a position at which the output rotor 70 is in contact with the second slanting surface 302 both change. A change in the speed change ratio between the input rotor 20 and the output rotor 70 can thus be achieved. That is, an automatic change in the speed change ratio in accordance with the load can be achieved.

In particular, the input rotor 20 according to the present preferred embodiment includes the pressure control cam 23. This contributes to maintaining good conditions of the contact between the input rotor 20 and the first slanting surface 301 of each planetary roller 30 and the contact between the output rotor 70 and the second slanting surface 302 of each planetary roller 30 while a load acting in the rotation direction is being applied to the input rotor 20. In addition, the pressure control cam 23 enables the continuously variable transmission 1 to function as a one-way clutch that causes no ratchet sound.

In addition, the continuously variable transmission 1 according to the present preferred embodiment further includes an adjustment mechanism 90 arranged to adjust the axial position of the positioning member 12. The adjustment mechanism 90 can be realized by, for example, a rod 91 fixed to the positioning member 12, and a wire mechanism 92 arranged to adjust the axial position of the rod 91. Note, however, that the adjustment mechanism 90 may alternatively be realized by another mechanism, such as, for example, a screw capable of axial positioning. The user of the bicycle 100 is able to adjust the axial position of the positioning member 12 by operating the adjustment mechanism 90. The axial position of the fixed end of the coil spring 60 is thus adjusted. As a result, the pressure applied by the coil spring 60 to the engagement member 81, the second bearing 82, and the movable ring 50 changes. That is, the aforementioned force Fd changes. The relationship between the load and the speed change ratio can thus be adjusted.

Figure 10:
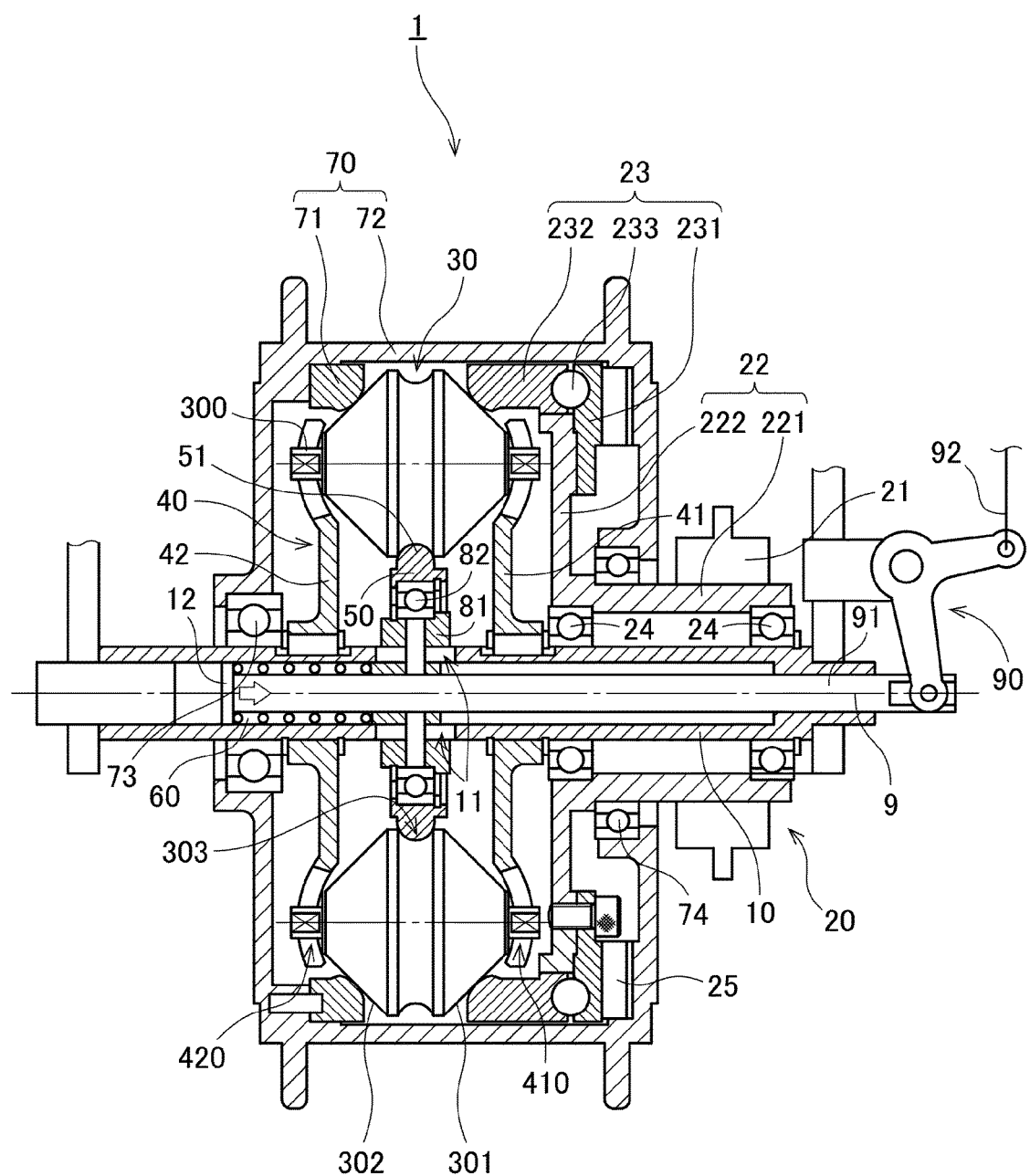
FIG. 10 is a vertical sectional view of the continuously variable transmission.

For example, if the axial position of the positioning member 12 is shifted toward the input rotor 20a as illustrated in FIG. 10, the aforementioned force Fd increases. This makes it easier to achieve a speed increase from the speed of the rotational motion of the input rotor 20. Meanwhile, if the axial position of the positioning member 12 is shifted away from the input rotor 20, the aforementioned force Fd decreases. This makes it easier to achieve a speed reduction from the speed of the rotational motion of the input rotor 20.

While preferred embodiments of the present invention have been described above, it will be understood that the present invention is not limited to the above-described preferred embodiments.

Figure 11:
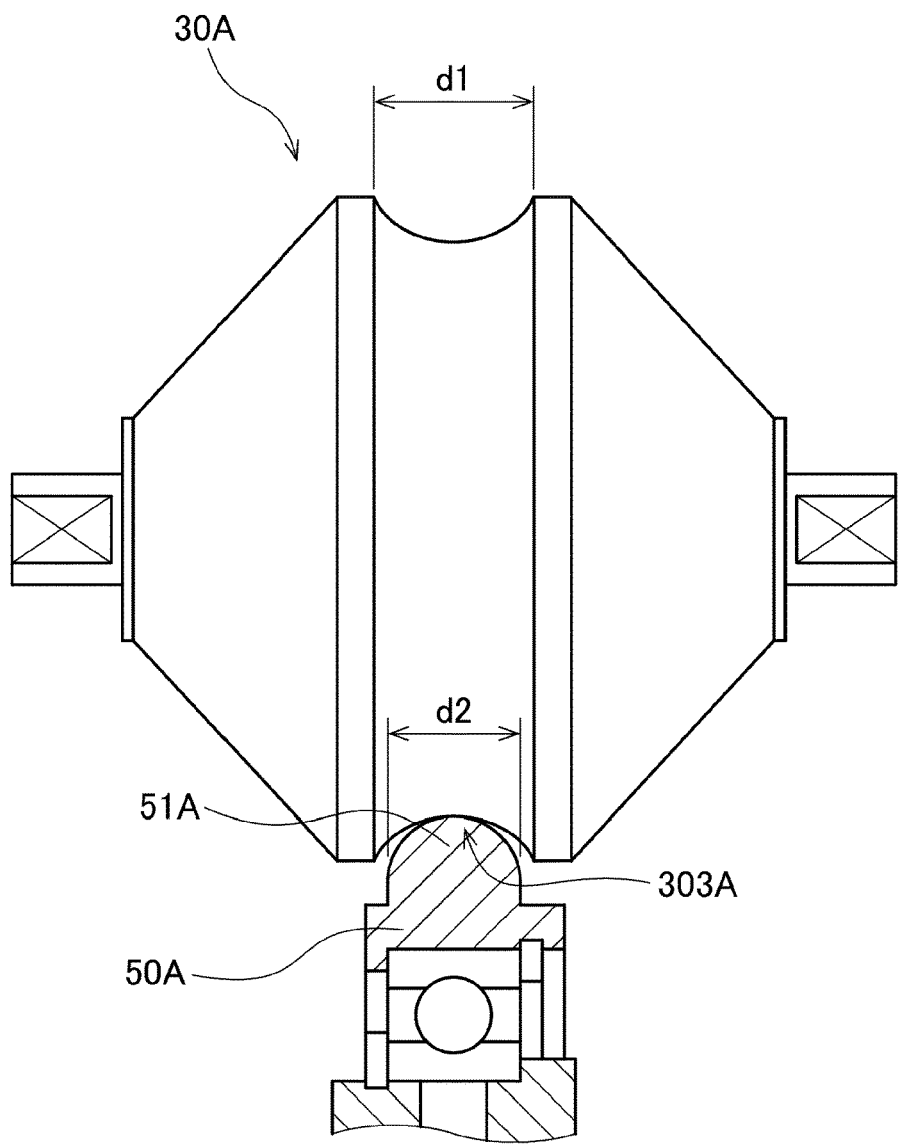
FIG. 11 is a diagram illustrating a planetary roller and a movable ring according to another preferred embodiment of the present invention.

FIG. 11 is a diagram illustrating a planetary roller 30A and a movable ring 50A according to another preferred embodiment of the present invention. In the preferred embodiment illustrated in FIG. 11, an annular recessed portion 303A of the planetary roller 30A is arranged to have an axial width d1 greater than an axial width d2 of an annular projecting portion 51A defined in an outer circumferential portion of the movable ring 50. In addition, in a section of a continuously variable transmission including a main axis, the annular recessed portion 303A is arranged to have a radius of curvature greater than a radius of curvature of the annular projecting portion 51A. This reduces an area of contact between the planetary roller 30A and the movable ring 50A. In addition, corner portions of the annular recessed portion 303A at both axial ends thereof do not make contact with the movable ring 50A. A reduction in contact resistance between the planetary roller 30A and the movable ring 50A can thus be achieved.

Figure 12:
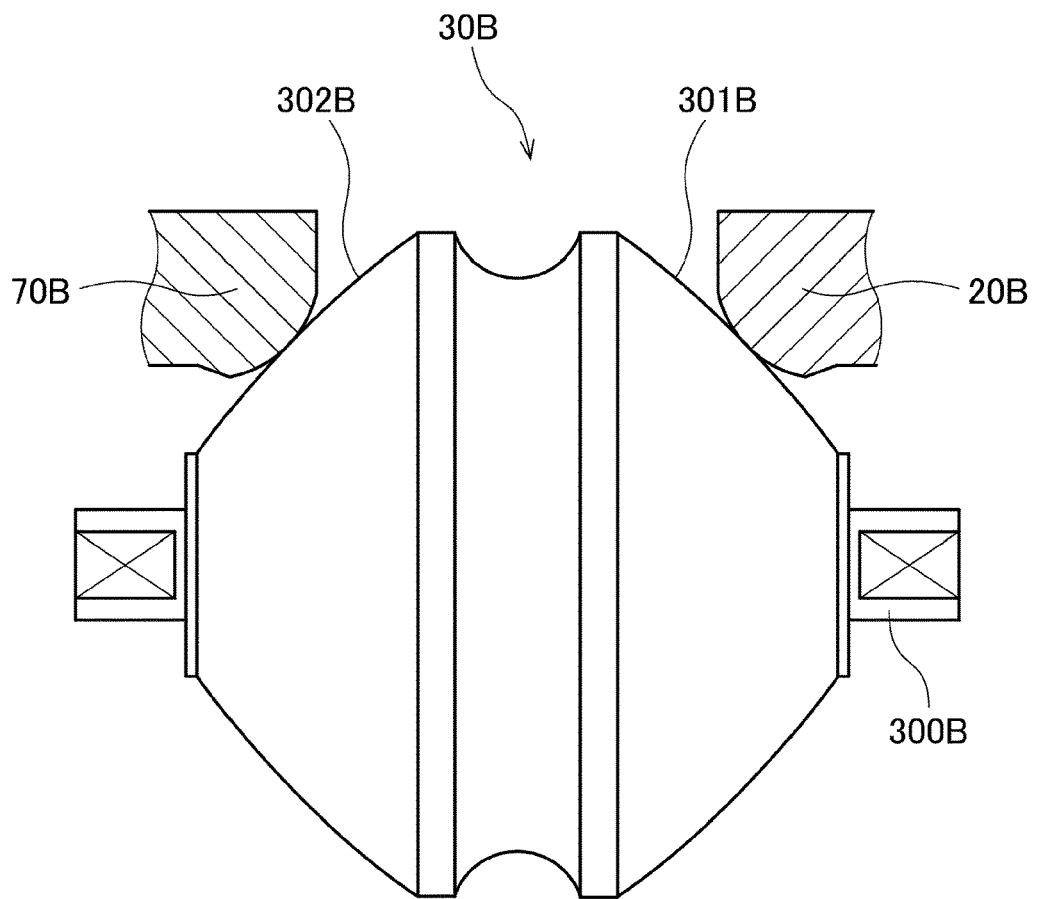
FIG. 12 is a diagram illustrating a planetary roller according to yet another preferred embodiment of the present invention.

FIG. 12 is a diagram illustrating a planetary roller 30B according to yet another preferred embodiment of the present invention. In the preferred embodiment illustrated in FIG. 12, a first slanting surface 301B of the planetary roller 30B is arranged to slightly bulge. More specifically, a generatrix of the first slanting surface 301B is curved in a convex shape in a section including an axis of a rotation shaft 300B. This makes it easier to maintain a condition of a contact between an input rotor 20B and the first slanting surface 301B in a better state. This increases stability of transmission of power from the input rotor 20B to the planetary roller 30B.

Moreover, in the preferred embodiment illustrated in FIG. 12, a second slanting surface 302B of the planetary roller 30B is also arranged to slightly bulge. More specifically, a generatrix of the second slanting surface 302B is curved in a convex shape in a section including the axis of the rotation shaft 300B. This makes it easier to maintain a condition of a contact between the second slanting surface 302B and an output rotor 70B in a better state. This increases stability of transmission of power from the planetary roller 30B to the output rotor 70B.

In the above-described preferred embodiment, the pressure control cam is provided only in the input rotor and not in the output rotor. Note, however, that the pressure control cam may be provided in the output rotor as well. This contributes to increasing contact pressure between the second slanting surface of the planetary roller and the output rotor.

Further, in the above-described preferred embodiment, the annular recessed portion is included in each planetary roller, and the annular projecting portion, which is fitted in the annular recessed portion, is included in the movable ring. Note, however, that the annular projecting portion and the annular recessed portion may alternatively be included in each planetary roller and the movable ring, respectively. In this case, the annular projecting portion of each planetary roller may be fitted in the annular recessed portion of the movable ring. In this case, if each planetary roller is defined by two members, it is preferable that the entire annular projecting portion belong to one of the two members.

The continuously variable transmission according to the above-described preferred embodiment is designed to be used in a bicycle. Note, however, that continuously variable transmissions having equivalent structures according to other preferred embodiments of the present invention may be used in applications other than bicycles. For example, continuously variable transmissions having equivalent structures according to other preferred embodiments of the present invention may be installed in tricycles, wheelchairs, trucks, automated guided vehicles, robots, or the like.

Note that the detailed shape of each of the continuously variable transmission and the bicycle may be different from the shape thereof as illustrated in the accompanying drawings of the present application.

Preferred embodiments of the present invention are applicable to, for example, continuously variable transmissions.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A continuously variable transmission comprising:
an input rotor arranged to rotate about a main axis at a rotation rate before a speed change;
an output rotor arranged to rotate about the main axis at a rotation rate resulting from the speed change;
a plurality of planetary rollers arranged around the main axis, each planetary roller including a rotation shaft and being capable of rotating about the rotation shaft;
a guide member arranged to restrict positions of both end portions of the rotation shaft;
an annular movable ring capable of rotating about the main axis between the main axis and the planetary rollers, and capable of moving in an axial direction; and
an elastic member capable of expanding and contracting in the axial direction; wherein each planetary roller includes:
a first slanting surface being conical and arranged to make contact with the input rotor;
a second slanting surface being conical and arranged to make contact with the output rotor; and
an annular recessed portion or annular projecting portion arranged to be engaged with the movable ring;
the guide member is arranged to hold the end portions of the rotation shaft at different circumferential positions such that each end portion of the rotation shaft is capable of shifting a position thereof in a radial direction with respect to the main axis; and
the elastic member is arranged to apply a pressure to the movable ring in the axial direction.

2. The continuously variable transmission according to claim 1, further comprising a cylindrical hollow shaft arranged to extend along the main axis, wherein each of the input rotor, the output rotor, and the movable ring is supported by the hollow shaft through a bearing.

3. The continuously variable transmission according to claim 2, wherein the elastic member is accommodated inside of the hollow shaft.

4. The continuously variable transmission according to claim 2, wherein
the guide member includes:
a first guide plate fixed to the hollow shaft, and including first cuts in each of which one end of the rotation shaft of a separate one of the planetary rollers is fitted;
a second guide plate fixed to the hollow shaft, and including second cuts in each of which another end of the rotation shaft of a separate one of the planetary rollers is fitted; and
circumferential positions of the first cuts with respect to the main axis are different from circumferential positions of the second cuts with respect to the main axis.

5. The continuously variable transmission according to claim 1, wherein the annular recessed portion or the annular projecting portion is arranged between the first and second slanting surfaces.

6. The continuously variable transmission according to claim 1, wherein
each planetary roller includes the annular recessed portion; and
an outer circumferential portion of the movable ring is arranged to make contact with a surface defining the annular recessed portion of the planetary roller.

7. The continuously variable transmission according to claim 6, wherein, in a section of the continuously variable transmission including the main axis, the annular recessed portion is arranged to have a radius of curvature greater than a radius of curvature of the outer circumferential portion of the movable ring.

8. The continuously variable transmission according to claim 1, wherein
the elastic member includes a fixed end and a free end which are both axial ends thereof;
the free end is fixed in the axial direction with respect to the movable ring; and
the continuously variable transmission further comprises an adjustment mechanism arranged to adjust an axial position of the fixed end.

9. The continuously variable transmission according to claim 8, wherein the adjustment mechanism is arranged to adjust the axial position of the fixed end through a rod or screw capable of axial positioning.

10. The continuously variable transmission according to claim 1, wherein the input rotor includes a pressure control cam arranged to generate an axial pressing force acting on the planetary rollers in accordance with a load acting in a rotation direction.

11. The continuously variable transmission according to claim 10, wherein
the pressure control cam includes:
a pair of annular cam members arranged in the axial direction; and
a rolling element arranged between the pair of cam members;
each of the pair of cam members includes:
a first cam surface arranged to make contact with the rolling element when the input rotor is rotating in one direction; and
a second cam surface arranged to make contact with the rolling element when the input rotor is rotating in another direction; and
an angle of the first cam surface with respect to a circumferential direction is smaller than an angle of the second cam surface with respect to the circumferential direction.

12. The continuously variable transmission according to claim 11, wherein
the angle of the first cam surface with respect to the circumferential direction is in a range of 3° to 35° inclusive; and
the angle of the second cam surface with respect to the circumferential direction is in a range of 70° inclusive to 90° exclusive.

13. The continuously variable transmission according to claim 1, wherein each planetary roller includes an internal cavity.

14. The continuously variable transmission according to claim 13, wherein each planetary roller includes:
a first planetary member being conical and including the first slanting surface; and
a second planetary member being conical and including the second slanting surface.

15. The continuously variable transmission according to claim 14, wherein
the first planetary member is arranged to increase in an axial or radial thickness with decreasing distance from a vertex of the first planetary member; and
the second planetary member is arranged to increase in an axial or radial thickness with decreasing distance from a vertex of the second planetary member.

16. The continuously variable transmission according to claim 14, wherein the entire annular recessed portion or the entire annular projecting portion belongs to one of the first and second planetary members.

17. The continuously variable transmission according to claim 1, wherein each of a generatrix of the first slanting surface and a generatrix of the second slanting surface is curved in a convex shape in a section including an axis of the rotation shaft.

18. The continuously variable transmission according to claim 1, wherein the continuously variable transmission is designed to be used in a bicycle.

19. A bicycle comprising the continuously variable transmission of claim 18.

* * * * *